(12) United States Patent
Lail

(10) Patent No.: US 7,881,337 B2
(45) Date of Patent: Feb. 1, 2011

(54) METHODS AND APPARATUS FOR INFORMATION MANAGEMENT SYSTEMS

(75) Inventor: Joseph Bryan Lail, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 589 days.

(21) Appl. No.: 11/843,266

(22) Filed: Aug. 22, 2007

(65) Prior Publication Data

US 2009/0268753 A1    Oct. 29, 2009

Related U.S. Application Data

(60) Provisional application No. 60/823,439, filed on Aug. 24, 2006.

(51) Int. Cl.
H04J 3/22 (2006.01)
(52) U.S. Cl. .................................... 370/466; 709/223
(58) Field of Classification Search ................ 370/466, 370/465, 467; 709/217, 223, 224, 225
See application file for complete search history.

(56) References Cited

U.S. PATENT DOCUMENTS

| 7,213,061 | B1 | 5/2007 | Hite et al |
| 2002/0002583 | A1 | 1/2002 | Fabri et al. |
| 2002/0068984 | A1 | 6/2002 | Alexander et al. |
| 2003/0061325 | A1 | 3/2003 | Monroe |
| 2003/0063623 | A1* | 4/2003 | Leslie et al. ................ 370/466 |
| 2003/0128698 | A1* | 7/2003 | Darland et al. ............. 370/360 |
| 2003/0204632 | A1* | 10/2003 | Willebeek-LeMair et al. ......................... 709/249 |
| 2004/0215694 | A1 | 10/2004 | Podolsky |
| 2004/0215711 | A1* | 10/2004 | Martin et al. ............... 709/203 |
| 2006/0249010 | A1 | 11/2006 | John et al. |
| 2007/0101272 | A1* | 5/2007 | Nomura et al. ............. 715/734 |
| 2009/0144167 | A1* | 6/2009 | Calamera .................... 705/26 |

OTHER PUBLICATIONS

European Patent Office, Extended European Search Report for European Application No. 07841262.4, Mail date Apr. 12, 2009, pp. 1-7.
Stamm et al., A Network-Centric Approach to Enhance National Airspace Security, Aerospace Conference, 2006 IEEE Big Sky MT, Mar. 4, 2006, pp. 1-10.

* cited by examiner

*Primary Examiner*—Brian D Nguyen
(74) *Attorney, Agent, or Firm*—SoCal IP Law Group LLP; John E. Gunther; Steven C. Sereboff

(57) ABSTRACT

Methods and apparatus for information management systems according to various aspects of the present invention operate in conjunction with a system interface to communicate with an external system, such as a weapon, and a network interface to communicate with a node connected to a network, such as the Global Information Grid. The information management system may further include a data processing system in communication with the system interface and the network interface to enable the external system to provide and consume services to and from a node connected to network.

18 Claims, 4 Drawing Sheets

METHODS AND APPARATUS FOR INFORMATION MANAGEMENT SYSTEMS

CROSS-REFERENCES TO RELATED APPLICATIONS

This application claims the benefit of U.S. Provisional Patent Application No. 60/823,439, filed Aug. 24, 2006, and incorporates the disclosure of such application by reference.

BACKGROUND OF THE INVENTION

The Global Information Grid (GIG) is a construct defined by the United States Department of Defense (DoD) for managing information technology. The GIG is intended to enable a network-centric (also known as "netcentric") approach for the DoD's warfighting, business, and intelligence capabilities. The NetCentric Operations and Warfare Reference Model (NCOW RM), published by the Office of Secretary of Defense Networks and Information Integration, is the architecture-based description required to implement the netcentric environment for the GIG. Within this architectural definition, the Net-Ready Key Performance Parameter (NR-KPP) establishes the interface requirements for the technical exchange of information and the overall effectiveness of that exchange. Systems that comply with the NR-KPP standard are deemed "Net Ready."

The NR-KPP has been developed to assess net-ready attributes required for both the technical exchange of information and the end-to-end operational effectiveness of that exchange. The NR-KPP assesses information needs, information timeliness, information assurance, and net-ready attributes required for both the technical exchange of information and the end-to-end operational effectiveness of that exchange. The NR-KPP consists of verifiable performance measures and associated metrics required to evaluate the timely, accurate, and complete exchange and use of information to satisfy information needs for a given capability.

Compliance with the NCOW RM and NR-KPP faces at least two major obstacles. First, a single information management system with a service-based architecture should function across a variety of mission areas and system types while simultaneously supporting open standards-based interfaces for an array of disparate devices. Creating multiple information management systems involves high development and maintenance costs, as well as compatibility issues in networking with other systems on a GIG. Second, many existing weapon systems and support devices are not Net Ready, as such systems were not developed for use in conjunction with the GIG. Further, operation within a service-oriented environment places unpredictable asynchronous processing loads on the real-time environment, which is almost exclusively predictable and synchronous in nature.

SUMMARY OF THE INVENTION

Methods and apparatus for information management systems according to various aspects of the present invention operate in conjunction with a system interface to communicate with an external system, such as a weapon, and a network interface to communicate with a node connected to a network, such as the Global Information Grid. The information management system may further include a data processing system in communication with the system interface and the network interface to enable the external system to provide and consume services to and from a node connected to network.

BRIEF DESCRIPTION OF THE DRAWING

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. The present invention may be realized by a machine executing instructions which may be stored on a machine-readable storage medium. For example, the present invention may employ various weapons or other devices, interfaces, communications systems and protocols, networks, data processing systems, and the like, which may carry out a variety of functions under the control of one or more microprocessors or other control devices. In addition, the present invention may be practiced in conjunction with any number of weapons systems, command and control systems, sensors, processes, applications, and environments, and the system described is merely one exemplary application for the invention. Further, the present invention may employ any number of conventional techniques for data processing, interfacing, data storage, data transfer, component control and configuration, and the like.

Figure 1:
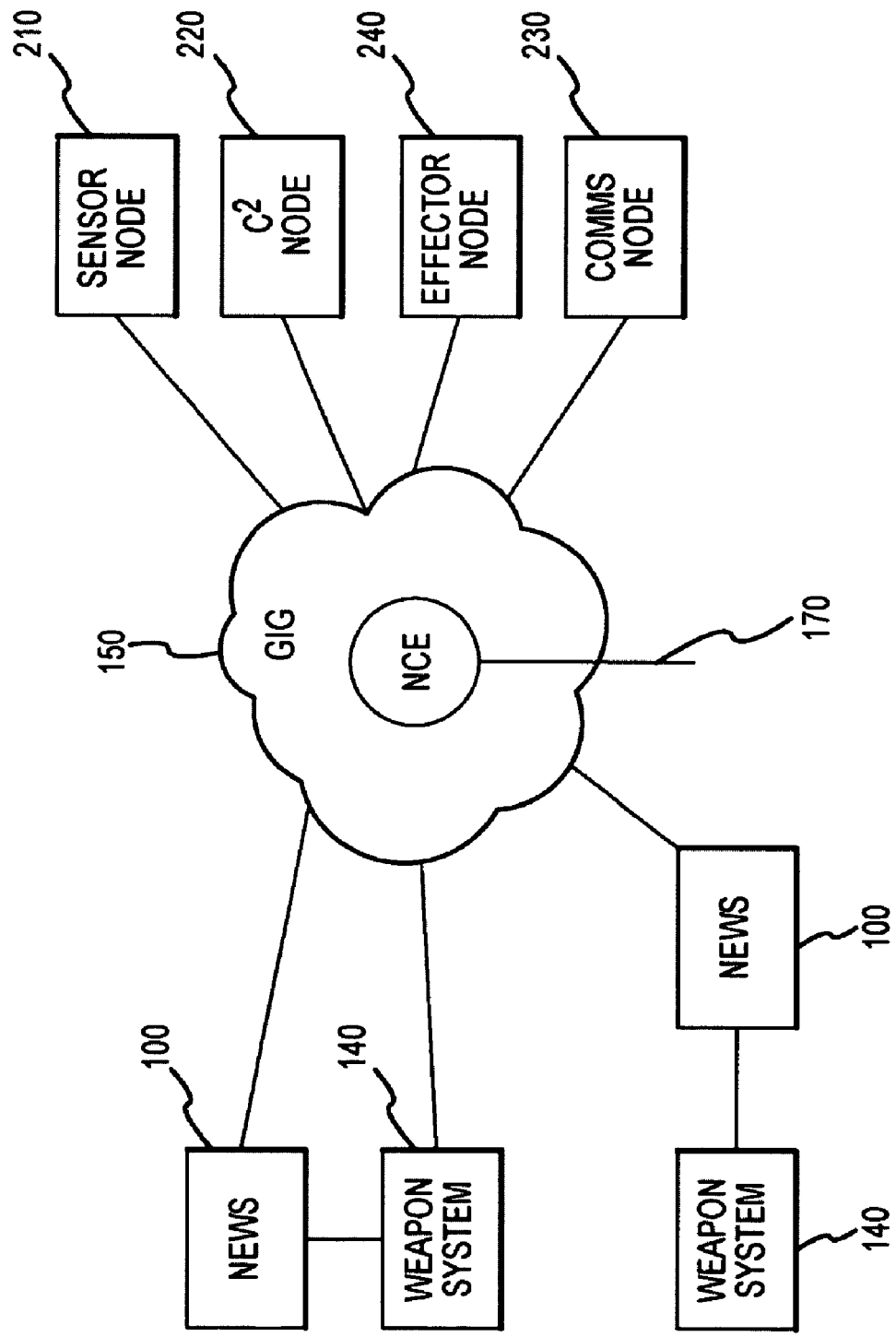
FIG. 1 is a block diagram of a network interconnecting multiple nodes

Referring to FIG. 1, an information management system according to various aspects of the present invention comprises a netted element weapon service (NEWS) 100, which facilitates the provision and consumption of services between a weapon system 140 and a network. The information management system may operate in conjunction with any appropriate element to connect to the network, such as a sensor, communications equipment, a weapon or other effector, or a command and control element. The information management system facilitates communication between the networked element and other systems via the network. The information management system enables the weapon system 140 or other system to work in the network environment, even if the weapon system 140 or other system is a legacy system that was not designed to operate in conjunction with the network, but instead as an isolated element or functioning within a smaller, dedicated operational context.

The network comprises a series of connections between network elements to facilitate communication. The network may comprise any suitable system for facilitating communications among the various network elements, such as a local network, a wireless network, or a peer-to-peer network, and may provide any appropriate characteristics for the application or adaptation of the information management system. For example, the network may comprise a defense-related network, such as the Global Information Grid (GIG) 150. The GIG 150 may comprise a net-centric system to provide processing, storage, management, and transport of information to support defense, national security, and related intelligence community missions and functions, including, operational, tactical, and business. The GIG 150 may be available from various operating locations, including bases, posts, camps, stations, facilities, mobile platforms, and deployment sites. The GIG may 150 interface with allied, coalition, and non-GIG systems. The GIG 150 may also provide the command authorities, warfighters, defense personnel, intelligence community, business, policy-makers, and non-defense users with information superiority, decision superiority, and full-spectrum dominance.

The network may operate in conjunction with a particular environment, mission, or application. For example, the GIG 150 operates in conjunction with the NetCentric Environment (NCE) 170, which may include any system, equipment, software, or service that transmits information to, receives information from, routes information among, or interchanges information among other equipment, software, and/or services; provides retention, organization, discovery, visualization, information assurance, or disposition of data, information, or knowledge received from or transmitted to other equipment, software, and services; or processes data or information for use by other equipment, software, or services. The GIG NCE 170 comprises assets that make up and assure LAN, campus area networks, tactical networks, operational area networks, MANs and WANS. The GIG NCE 170 also includes GIG assets that include and assure end user devices, work stations and servers that provide local, organizational, regional or global computing capabilities. The GIG NCE 170 further includes software associated with the operation of NCE 170 assets and the development environments and user productivity tools used in the GIG 150.

The network may offer any appropriate services and resources. The GIG NCE 170 includes a common set of enterprise and mission specific services, called GIG Enterprise Services (GIG ES), which provide awareness of, access to and delivery of information on the GIG. GIG ES establishes a collection of core services that provides the foundation for lower-level GIG components all the way down to the individual soldier. GIG ES enables distributed storage, information assurance and security, collaboration, messaging, mediation, service management, discovery, application hosting, user assistance, and interfaces for node-to-client connectivity. Functional core services may include, however, any appropriate services.

The GIG 150 may interconnect any appropriate devices, computer systems, and other actors capable of providing and consuming services. For example, the GIG 150 may include nodes that consume or provide services and/or data via the GIG 150, such as one or more sensor nodes 210, command and control nodes 220, communications nodes 230, and effector nodes 240. The nodes on the GIG 150 may use any appropriate method to communicate information with each other or other devices, such as the direct communication of data between nodes or by using an intermediary communications node 230 to distribute information. The nodes may comprise devices that provide and/or consume information, or may be junctions for facilitating communications with such devices. In the present embodiment, the nodes comprise net ready points of presence on the GIG 150.

In the present embodiment, the sensor nodes 210 may comprise sensors for gathering and distributing information, such as radar, seismic sensors, infrared imaging sources, satellites, intel postings, targeting systems, UAVs, recon elements, weather sensors, or other systems. Each sensor node 210 may comprise one or more individual sensor devices, such as a ground-based monitoring station having a combination of infrared cameras, auditory listening devices, and radar to detect incoming targets. The sensor node 210 may also comprise suitable personnel operating a system, such as an operator entering data at a computer terminal connected to the GIG 150. The sensor node 210 may perform any other appropriate function, such as to execute processing algorithms on incoming data to prepare it for transmission to other nodes on the GIG 150. Sensor data from the sensor nodes 210 connected to the GIG 150 may be made globally available one or more other nodes connected to the GIG 150 in any appropriate manner, such as via posting or through the use of a data registry.

The command and control nodes 220 provide command and control over various systems, such as the network elements. For example, the command and control node 220 may process information from the sensor nodes 210 and receive and request services of other nodes as appropriate. The command and control node 220 may comprise any suitable systems, devices, personnel, and the like, and the command and control node 220 may communicate with other nodes on the GIG 150, such as to control deployment of sensors, weapons, communication systems, and/or other assets. The command and control node 220 may, for example, make requests of the sensor node 210 to gather specific information, utilize one or more automated algorithms in processing received information, and request action as a result via an effector node 240. In one exemplary embodiment, the command and control node 220 may comprise a computer system that may make a service request for data on incoming targets from a sensor node 210 comprising a radar station, which gathers the data and relays it back to the command and control node 220. The command and control node 220 may then analyze the data and generate an appropriate fire mission to destroy or disable the targets, and then make an appropriate service request for an effector node 240, such as directing a missile battery to launch missiles at the targets specified by the command and control node 220.

The communications node 230 provides and consumes services relating to the communication of information, for example with other nodes connected to the GIG 150. The communications node 230 may comprise any systems, devices, and/or personnel for controlling and/or effecting communications. For example, the communications nodes 230 may include a communications satellite, which relays data between various other nodes on the GIG 150. The communications node 230 may also include any other device or system suitable for transmitting and receiving data, such as email, the Internet, wireless communication devices, communication switches, mobile communication systems, LANs, MANs, WANs, and the like. The communications node 230 may employ any suitable protocol or method for communicating data, such as wireless communications, burst transmissions, encryption, and/or TCP/IP data packets.

The effector nodes 240 provide desired services to effect mission goals, such as weapons, military units, targeting systems, or other equipment. The effector nodes 240 may respond to commands from the command and control node 220 and take appropriate action as a result. For example, the effector nodes 240 may include a missile battery, which fires missiles at targets identified by the command and control node 220. The effector node 240 may communicate with other appropriate systems or devices. For example, an effector node 240 may comprise an individual missile, which can be commanded to seek specific targets, navigate, and detonate according to specific commands received from other nodes on the GIG 150. Multiple effector nodes 240 may coordinate amongst themselves or any other nodes, such as to ensure that sufficient and appropriate firepower has been directed at an enemy threat.

The networked element may comprise any appropriate system for providing and/or receiving information via the network, and may comprise or be associated with one or more nodes. In the defense-related embodiment, the networked element may comprise a tactical or strategic warfighting system, such as communications systems, sensors, command and control systems, and the like. In the present exemplary embodiment, the networked element comprises a weapon system 140, such as a missile, armed unmanned aerial vehicle, launcher, or the like. The weapon system 140 may be configured for compliance with GIG operations, or may be configured without regard for GIG operations, such as a legacy weapon developed prior to deployment of the GIG. For example, the weapon system 140 may comprise an SM-X variant surface-to-air interceptor missile, a non-line-of-sight precision attack missile (NLOS PAM), miniature air-launched variant (MAL-X) missiles, air-to-air weapons such as the AIM-X series of missiles, anti-armor missiles or batteries, or other systems. Alternatively, the networked element may comprise a non-weapon system, such as a command and control system, a communication system, or a sensor system.

Figure 2:
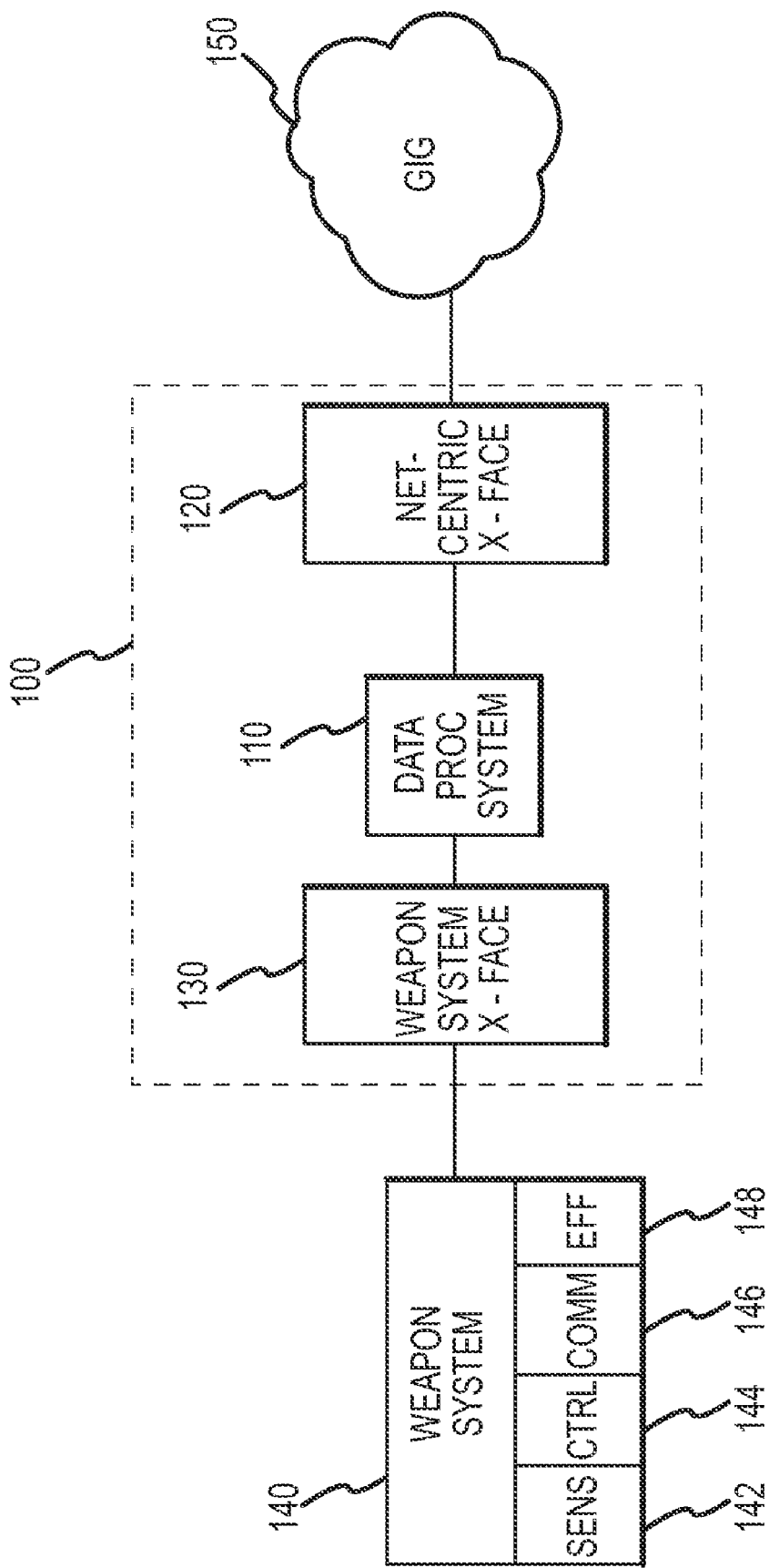
FIG. 2 is a block diagram of an information management system connecting a weapon system to a GIG.

Referring to FIG. 2, the weapon system 140 may include various subsystems for selected functions. For example, the weapon system 140 may include a sensor subsystem 142 with one or more sensors, such as targeting sensors like radar, infrared, and LADAR (LAser Detection And Ranging) systems, navigation sensors for navigation information like airspeed, attitude, and position, and environmental sensors measuring internal and external pressure readings, weather conditions, and the like. The weapon system 140 may also comprise an effector subsystem 148 to generate selected effects, such as fuze/warhead systems, jammer/decoy systems, and directed energy devices. The weapon system 140 may further include a control subsystem 144 for control functions, such as a mission computer to control target discrimination, guidance, and propulsions functions, target and navigation sensors in the sensor subsystem 142, and/or warhead and fuze controllers in the effector subsystem 148. A communication subsystem 146 may include any relevant communications systems, such as data terminals for physical transmit/receive channels, internal messaging elements like component data flow controllers, and network support like switching and encryption systems.

The NEWS 100 allows the weapon system 140 or other element to interact with nodes on the GIG 150 to provide and/or consume services. In the present embodiment, the NEWS 100 facilitates communication and control between the weapon system 140, which may comprise a synchronously operating system, and the GIG 150, which comprises an asynchronous, service-oriented environment, without disrupting the real-time performance of the synchronous weapon system 140. The NEWS 100 permits real-time software to perform within the service-oriented environment of the GIG 150 without disrupting the real-time performance. The NEWS 100 provides a mediation function that translates, routes, and manages the relationship between the external NCE 170 and the embedded processing within the weapon system 140.

The information management system may facilitate communication between the network nodes according to any appropriate techniques and protocols. In one embodiment, the NEWS 100 provides a Net Ready standards-based interface for communicating via the GIG 150. The NEWS 100 may provide Net Ready capability to multiple different weapons and other systems by employing a common logical architecture and an information and service management layer with support for open standards-based interfaces. The NEWS 100 may include core management service, software, algorithms, and connection methods, both to the network and to the networked element. Thus, the NEWS 100 may facilitate Net Ready compliance for different systems, the use of modular, Net Ready weapons and other networked elements, and/or multi-mission weapons that are Net Ready.

In the present embodiment, the NEWS 100 includes an information management and service layer to provide an interface between the weapon system 140 and the GIG 150, and may be configured for providing fully Net Ready weapons or other netted elements. The present NEWS 100 information management and service layer is implemented in conjunction with the service-oriented architecture and open standards-based interfaces as defined in the NCOW RM such that the weapon system 140 may provide weapon services in the NetCentric environment. The NEWS 100 may manage information, follow a service-oriented architecture, and use appropriate technology standards to make the weapon a Net Ready consumer and provider of services. In addition, the NEWS 100 may be configured to support any weapon system or sub-system that includes relevant open standards-based interfaces as a viable part of a fully netted weapon, independent of the provider of the sub-system. Thus, the NEWS 100 provides to the battlespace an information and service management layer that supports the Net Ready-mandated service-oriented architecture defined in the NCOW RM. The NEWS 100 provides the architecture for a full Net Ready weapon driven by service-oriented architecture and open standards-based interfaces as defined by NetCentric Operation and Warfare Information Integration requirements.

Referring again to FIG. 2, an exemplary NEWS 100 according to various aspects of the present invention includes a data processing system 110 in communication with a netcentric interface 120 and a weapon system interface 130. The data processing system 110 receives and processes service requests from or to the weapon system 140. The netcentric interface 120 formats and translates service-related data for use by nodes connected to the GIG 150. The weapon system interface 130 transmits data to and from the subsystems of the weapon system 140 and formats and translates service requests for use by the weapon system 140.

The netcentric interface 120 facilitates communication between the NEWS 100 and other nodes of the GIG 150. The netcentric interface 120 may comprise any suitable hardware and/or software system for the transmission and/or reception of information via the GIG 150. In the present embodiment, the netcentric interface 120 comprises an open standards-based interface connected between the GIG 150 and the data processing system 110 to allow the NEWS 100 to provide and consume Net Ready services with respect to other Net Ready Systems connected to the GIG 150.

In one exemplary embodiment, the netcentric interface 120 includes a service-oriented architecture compliant with the DoD's NCOW RM and NR-KPP standards. The netcentric interface 120 may also communicate with other systems and devices. For example, the netcentric interface 120 may detect that another device is not capable of communicating using the NR-KPP standard, and may switch to an alternate method of communication. The netcentric interface 120 may process data in any manner necessary to communicate with Net Ready systems, such as parsing data provided by a weapon system 140 which is not compliant with NR-KPP to build structures and packets compliant with the NR-KPP communications standard.

The weapon system interface 130 allows communication between the data processing system 110 and the weapon system 140. The weapon system interface 130 may communicate with the weapon system 140 in any appropriate manner, such as through the data packets sent over a wireless network or via hard-wired connections. In one embodiment, the weapon system interface 130 comprises an open-standard compliant interface between the NEWS 100 and the weapon system 140. The weapon system interface 130 may communicate with any appropriate aspect of the weapon system 140 and/or weapon subsystem. In one exemplary embodiment according to various aspects of the present invention, the weapon system interface 130 allows communications between the data processing system 110 and the sensor subsystem 142, control subsystem 144, communications subsystem 146, and/or effector subsystem 148 of the weapon system 140.

The weapon system interface 130 may provide any appropriate level of communication with the weapon system 140, and the weapon system 140 may be suitably modified to accommodate the weapon system interface 130. Various levels of netcentric capability may be implemented for the weapon system 140 in conjunction with the NEWS 100, ranging from minimum compliance with the NR-KPP standard to a fully-developed Net Ready weapon system 140. The weapon system 140 may require modification to provide data needed by the netted element weapon service 100 in communicating with other nodes on the GIG 150. For example, communication between the weapon subsystems 142, 144, 146, 148 and the weapon system interface 130 may require modification to the software and/or hardware of the weapon system 140.

Figure 3:
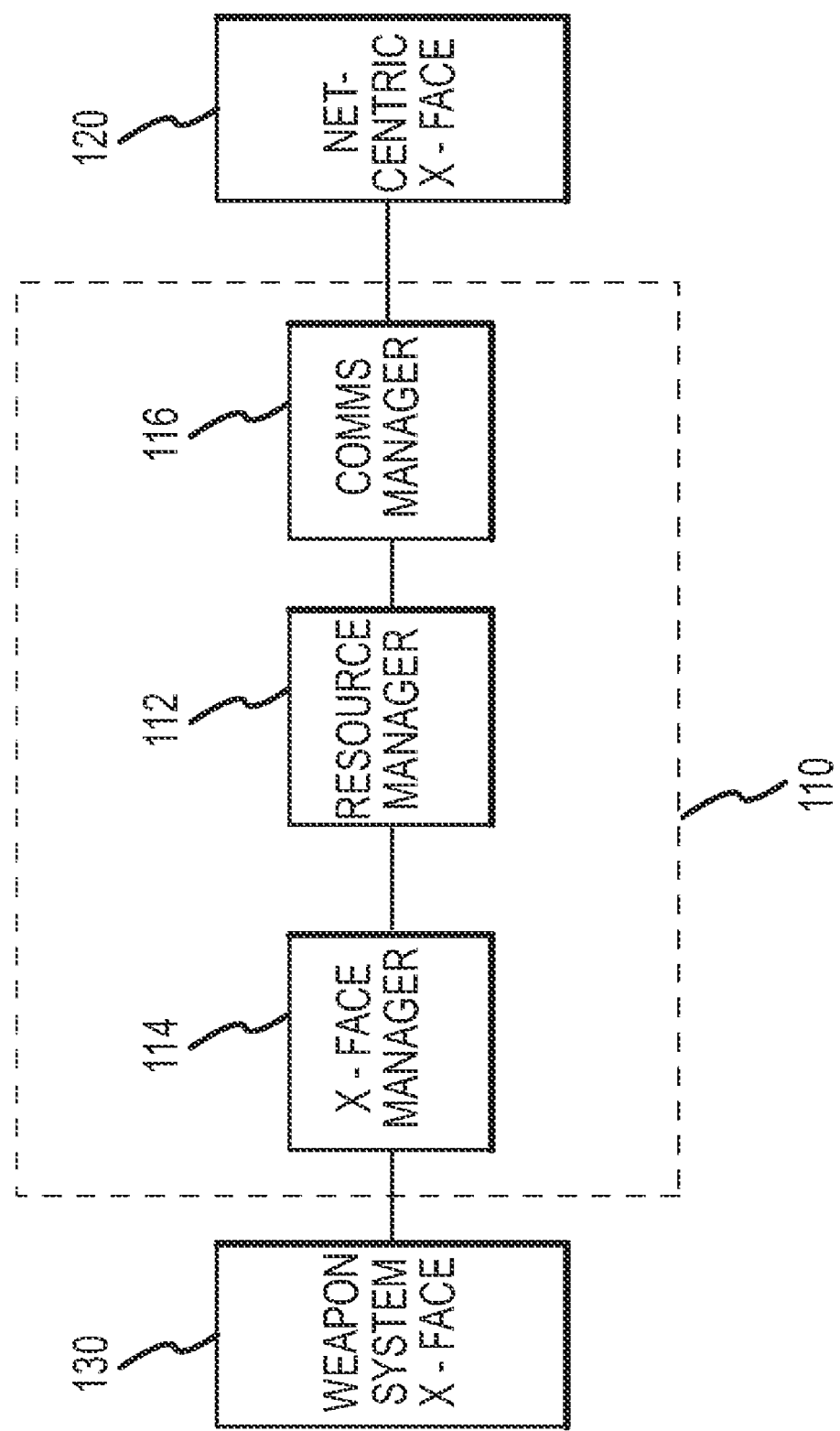
FIG. 3 is a block diagram of a data processing system.

Referring to FIG. 3, the interface manager 114 may support any level of compliance with the netcentric interface. In one embodiment, four levels of weapon system 140 integration are supported by the architecture of the netted element weapon service 100. At a low level of implementation, the weapon system interface 130 may be connected to the weapon system 140 to make the internal data of the weapon system 140 available to the NEWS 100. For example, hardware and software may be added to weapon system 140 to expose data to the NEWS 100. The weapon system interface 130 may modify the data for communication between the NEWS 100 and the weapon system 140, such as by using software gaskets, wrappers, or other constructs that enable the data streams of the weapon system 140 to be exposed via the weapon system interface 130.

At a second level, software may be added to the weapon system 140 to add input/output capability between the weapon system 140 and the NEWS 100. A third level includes partial implementation according to the NR-KPP standard, for example, where some of the hardware and software components or subsystems 142, 144, 146, 148 of the weapon system 140 are completely upgraded to fully comply with the NR-KPP interface standard, while other components or subsystems are not. At the fourth level, each and every component of the weapon system 140 is fully compliant with the NR-KPP standard.

Multiple levels of integration may be present within the same weapon system interface 130 and weapon system 140. For example, some components of the weapon system 140 may be upgraded with the first level of integration to expose their data streams, while other components may be upgraded with the second level of integration to enable two-way communication between the components and the netted element weapon service 100.

The data processing system 110 manages the internal resources for services provided and consumed by the weapon system 140, processes information sent and received through the netcentric interface 120 and the weapon system interface 130, and/or oversees the transmission of service requests to and from the weapon system 140. The data processing system 110 may be implemented in any suitable manner, such as through software, hardware, or a combination, to facilitate the interaction between the GIG 150 and the weapon system 140. For example, the data processing system 110 may include systems for managing the resources associated with the weapon system 140 and controlling communications between the weapon system 140 and other systems. In one exemplary embodiment, the data processing system 110 includes a resource manager 112 to manage the use of the weapon system 140 resources, an interface manager 114 to facilitate communications with the weapon system 140, and a communications manager 116 for managing communications with the GIG 150.

The data processing system 110 may facilitate adaptation to an array of different systems. For example, the resource manager 112, the interface manager 114, and the communications manager 116 may facilitate operation with defined standards-based open interfaces to any compliant weapon hardware or software subsystems or component, allowing a degree of "plug and play" capability or re-use for subsystems that can meet various requirements, such as physical size and power constraints for netted elements. The data processing system 110 may provide a layered approach to working with the interfaces and providing extensibility to final mission-specific tailoring and a weapon growth path as capabilities are added, with minimum impact on design and cost to weapon subsystem interface updates based on new technology standards.

The interface manager 114 allows the weapon system 140 to communicate with the NEWS 100 by providing a translation layer between the NR-KPP compliant netcentric interface and the weapon system 140. The NEWS 100 may support open standards-based interfaces, enabling any provider of a weapon system, subsystem, or component to contribute to cost-effective netted weapons (Net Ready compliant) by meeting an interface definition, with management of netted weapon services and Net Ready compliance transparent to the subsystem, also enabling cost effective transitional or partial capabilities for legacy systems. Consequently, the NEWS 100 may be implemented on legacy systems with minimal impact on development and unit cost to provide partially netted capabilities and an extensible path to full netted weapon capability.

The interface manager 114 may comprise any suitable combination of hardware and software systems, devices, and other suitable components. Translation of data from the weapon system 140 by the interface manager 114 may be implemented in any suitable manner, such as through software adapters and wrappers. For example, the interface manager 114 may be configured to provide management layer controlled internal weapon interfaces to meet the Net Ready KPP. In one example of the present embodiment, software and/or hardware may be added to the weapon system 140 to expose data and signals normally internal to the weapon system 140, as well as to translate data from the NEWS 100 and the netcentric environment into a format that can be utilized by the weapon system 140. The interface manager 114 may provide access to the resource manager 112 through adapters for the system registry, then application adapters, then wrapping of legacy code. Data from the weapon system 140 may be exposed to nodes connected to the GIG 150 through any suitable manner, such as through a web page interface over the Internet. The interface manager 114 thus enables standards-based interfaces not only to new-start weapon designs with attendant benefits from commonality and re-use, but also to legacy weapons through providing middleware for legacy stovepipe subsystems not designed with the intent to expose data to external users. Adaptations and configuration of the interface manager 114 allow multiple types of integration, implemented depending on results of cost effectiveness or other criteria.

The resource manager 112 provides internal resource management for the services provided and consumed by the weapon system 140. The resource manager 112 may implement management services, software, algorithms, and connection methods, both to the GIG 150 and to the weapon system 140. The resource manager 112 may also manage both hardware and software systems in the weapon 140. Global resource management in the NetCentric Environment 170 is handled as part of core enterprise services and net operations, but those do not solve all resource management needs on the node assets themselves as providers and consumers of services. The resource manager 112 is suitably configured to transparently provide and consume services for the weapon system 140 in conjunction with the GIG 150, regardless of the type of weapon system 140 or other networked element. The resource manager 112 may operate through an automated control core with system interfaces to various subsystems to enable transparent exposure of services provided and consumed to the external battlespace.

The resource manager 112 effectively presents the subsystem hardware and software as netted elements via the subsystem interfaces. In the present embodiment, the resource manager 112 uses a local system registry to account for services provided and consumed. The local system registry may be embedded within the NEWS 100 or in communication with the NEWS 100. The local system registry may provide any suitable information regarding weapon system 140, such as the weapon system's 140 type or other identifier, the weapon system's 140 status, the services available via the weapon system 140, anticipated response times to service requests, and/or descriptions of services that may be consumed by the weapon system 140. In the present embodiment, the local system registry provides an identifier of the weapon system 140 type, which can be used by other elements of the GIG 150 to determine the capabilities of the weapon system 140. The present local system registry also provides the weapon system's status, such as a description of which services associated with the weapon system 140 type are currently available for the particular weapon system 140 associated with the NEWS 100. Thus, services the specific system is capable of providing are defined and populated before system deployment, just before operational use or launch (if a weapon), or during flight. The present local system registry provides the service descriptions that enable the NEWS 100 to respond to external users and internal systems that the requested service is available and when it can be performed.

Figure 4:
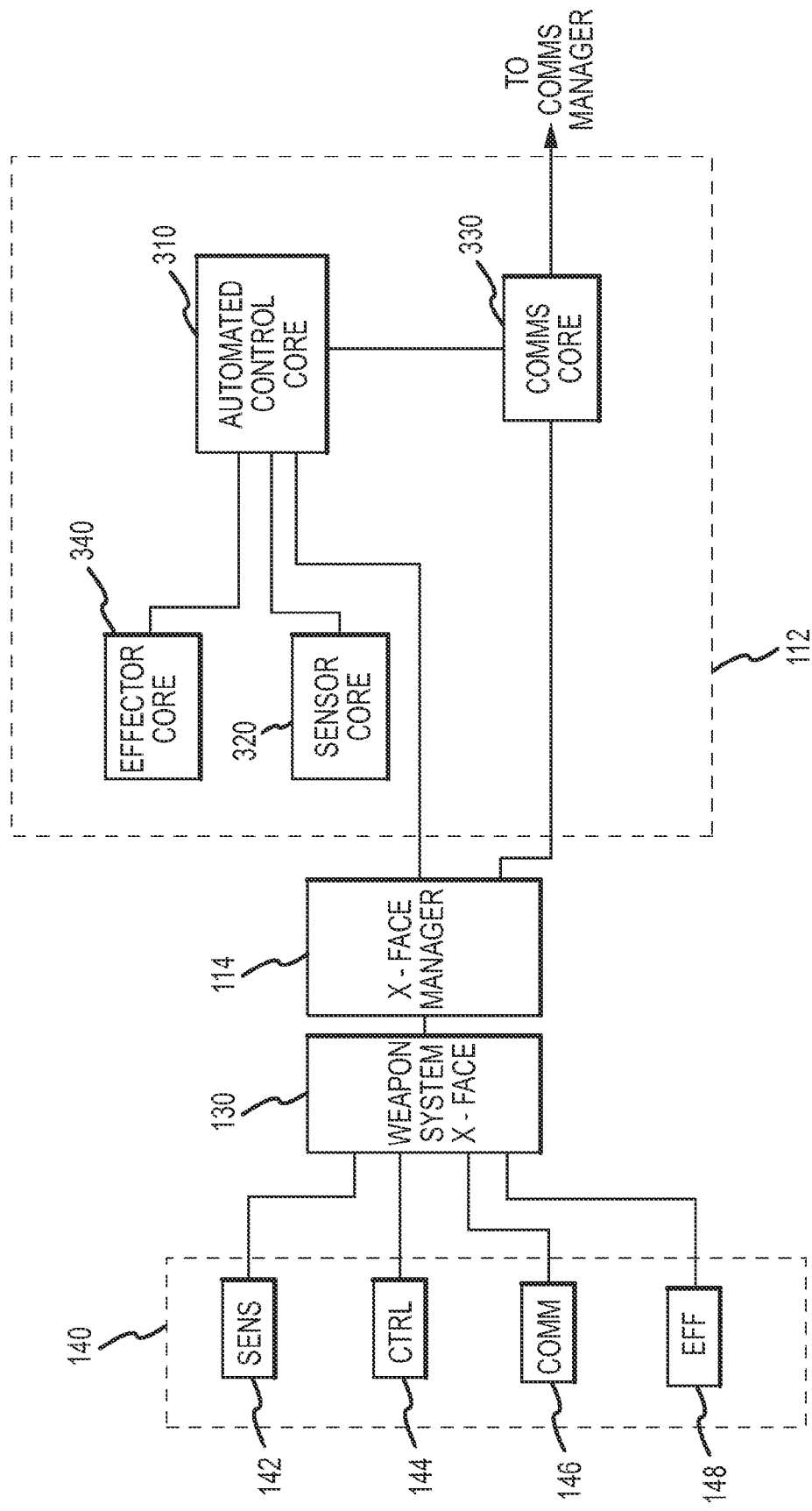
FIG. 4 is a block diagram of a resource manager.

Referring to FIG. 4, in the present embodiment, the resource manager 112 processes and manages service requests received and sent via the GIG 150, includes a central automated control core, and includes elements for controlling and interacting with the weapon system 140 and the GIG 150. For example, the resource manager 112 may comprise an automated control core 310, a sensor core 320, a communications core 330, and/or an effector core 340. The various cores 310, 320, 330, 340 may operate as intra-nodal system interfaces and combine to enable the weapon subsystems 142, 144, 146, 148 and the nodes on the GIG 150 to interact with each other to provide and consume services. The resource manager 112 may facilitate transparently providing and consuming services in the automated control core 310 working with the communications core 330, the sensor core 320, and the effector core 340. The NEWS 100 may thus enable interfacing with any compliant weapon subsystem.

The automated control core 310 manages the provision and consumption of control services between the weapon system 140 and nodes connected to the GIG 150. The automated control core 310 may perform any suitable function to control and/or communication with the weapon system 140, such as controlling the NEWS 100 interfaces at the service and information management layer and managing the weapon system interface 130. The automated control core 310 may provide automated control management for the sensor, control, communication, and effector subsystems 142, 144, 146, 148 on the weapon via the open-standard weapon system interface 130. For example, the automated control core 310 may provide local command and control functions, such as to determine the information to be provided to and requested from the GIG 150 and to manage local weapon system 140 resources, such as the sensor, control, communication and effector subsystems 142, 144, 146, 148 and the sensor core 320, communications core 330, and effector core 340. In the present embodiment, the automated control core 310 both provides and consumes services via the GIG.

For example, the automated control core 310 may respond to deployment commands received via the GIG 150 and control the weapon system 140 accordingly. In addition, the automated control core 310 may request services from other nodes of the GIG 150. For example, the automated control core 310 in a missile may request sensor services from a sensor node 210, which may comprise a ground-based radar system connected to the GIG 150 to gather target information in addition to data provided by the missile's own sensor core 320 and/or sensor subsystems. The automated control core 310 may also combine data from a variety of sources. Furthermore, the automated control cores 310 of multiple nodes may combine data processing capabilities and control services to make decisions or achieve other suitable results more quickly and efficiently.

The automated control core 310 may also manage the weapon system interface 130 to control the weapon system 140. For example, automated control core 310 may receive requests from the weapon subsystems 142, 144, 146, 148 and/or the sensor core 320, communications core 330, and effector core 340 for data or commands, which the automated control core 310 may process and/or transmit via the GIG 150. The automated control core 310 may also relay responses received via the GIG 150 or generate appropriate commands according to locally run algorithms and/or responses received via the GIG 150. The automated control core 310 may communicate via the weapon system interface 130 and/or the sensor core 320, communications core 330, and effector core 340 with the weapon subsystems 142, 144, 146, 148, such as a mission computer in the control subsystem 144 to operate guidance systems, control systems, and propulsions systems, target and navigation sensors in the sensor subsystem 142, and/or warhead and fuze controllers in the effector subsystem 148.

In one exemplary embodiment, the automated control core 310 manages control services relating to the guidance and propulsion systems of a missile. For example, the automated control core 310 in a missile may take data collected by the sensor core 320, run one or more target discrimination algorithms, and determine whether a target has been properly identified according to factors such as the discrimination level for optimal target engagement and the time to intercept the target. The automated control core 310 may request additional target data via the GIG 150 to supplement the data received from the sensor core 320, and adjust the guidance and effector systems accordingly to optimize the effect on the target.

The sensor core 320 manages data received from sensor devices and components in the weapon system 140. For example, the sensor core 320 may collect data regarding a target from the sensor subsystem 142 such as target, navigation, and environmental data in response to requests from the automated control core 310 and/or the sensor subsystem 142. The sensor core 320 may operate as a node to provide and consume services with respect to the automated control core 310 and/or the GIG 150. The sensor core 320 may be configured according to the weapon system 140 sensors and data types, and may provide a control interface between the automated control core 310 and the sensor subsystem 142 to facilitate interaction between the automated control core 310 and the sensor subsystem 142, such as to translate data streams for use by the automated control core 310 and to dynamically allocate sensor resources.

The communications core 330 supports all appropriate data interface standards to enable the NEWS 100 to interface with any other suitable system and device, such as a communication subsystem 146 in the weapon system 140. The communications core 330 may operate as a service provider and consumer with respect to the automated control core 310 and/or the GIG 150, and may meet communication requirements and support data standards for relevant node interfaces, such as with the GIG 150 and the weapon system 140. In the present embodiment, the communications core 330 communicates with the communications subsystem 146 to facilitate interaction between the automated control core 310 and the communications subsystem 146 to control the communication subsystem 146 resources. The communications core 330 may manage the internal messaging for the data processing system 110, such as the data flow between the automated control core 310 and the effector core 340 and sensor core 320.

The effector core 340 interfaces with the effector subsystem 148 of the weapon system 140, such as fuzes/warheads, jammer/decoy systems, and directed energy devices. The effector core 340 may respond to commands and signals from any suitable source, such as from the automated control core 310. The effector core 340 may operate as a service provider and consumer to the node interface with respect to the automated control core 310 and/or the GIG 150, and may be configured to support the relevant core weapon system effector data types and dynamic resetting. In the present embodiment, the effector core 340 communicates with the effector subsystem 148 to facilitate interaction between the automated control core 310 and the effector subsystem 148 to control the effector subsystem 148 resources. For example, the automated control core 310 for a missile may refrain from directing the effector core 340 to arm the warhead of the missile until an authorization command is received from a specific command and control node 220 connected to the GIG 150.

The communications manager 116 manages communications between the NEWS 100 and the GIG 150. Global communications management in the NetCentric environment is handled as part of core enterprise services and net operations, including reduction of bandwidth required for a tactical user, by providing common and community of interest-specific services that allow off-loading of processing and storage requirements, but these do not solve all communications management constraints due to limited bandwidth for tactical users. The communication manager 116 may manage communications according to any selected criteria and techniques. For example, the communications manager 116 may minimize the bandwidth overhead involved in providing or consuming services by the weapon system 140.

In the present embodiment, the communications manager 116 may be configured to utilize a local system registry in communication with other systems, such as other systems equipped with the NEWS 100 or a NEWS "agent", hosted at other NetCentric nodes, to provide and consume services as a Net Ready Node without requiring, in many circumstances, the full transmission of raw data otherwise needed. The NEWS 100 may provide partial Netted Weapon capabilities for transitions lacking universal Net Ready systems by hosting tailored NEWS agents, or managed interfaces with replicated software, at other weapon or non-weapon nodes such as command and control, communication, and sensor nodes 220, 230, 210. The communications manager 116 may be configured to support standards-based interfaces to enable transitional capability on the path to full Net Ready systems by hosting the tailored version of NEWS at the other battlespace nodes, permitting work-around interfaces with netted weapons before the full GIG Enterprise Services and GIG infrastructure are in place.

In the present embodiment, the communications manager 116 allows a Net Ready system to provide and consume services without requiring the full transmission of raw data normally needed, for example by reconstructing the requested information using metadata and lean messages. Additionally, the communications manager 116 may reduce bandwidth requirements by only transmitting updated data (data that has changed from the last transmission) instead of the entire set of requested data. The reduced bandwidth communication may be performed in any appropriate manner, such as through reconstructing requested information at non-weapon nodes using the NEWS agent based on metadata and lean messages, and/or a bidding construct where data must buy its way into transmissions when bandwidth is saturated through meeting importance and timeliness criteria.

The communication manager 116 may communicate data in any format in any appropriate manner. For example, the communication manager 116 in a missile may post the missile's identity, status, and other telemetry data to enable other nodes connected to the Global Information Grid 150 to track the position of the missile in real time. Data posted by the communications manager 116 may be used for any other suitable purpose, such as to optimize the weapon mix allocation among a selection of targets. In one example of the present invention, multiple missiles employing the NEWS 100 register through a user profile to the enterprise information environment, which authorizes roles for the missiles based on, in part, the rules of engagement programmed into each missile, for example prior to launch or during a mission.

In one embodiment of the present invention, the communications manager 116 supports posting and translation for ad-hoc communication between other weapon systems 140 to ensure that a target is engaged with sufficient firepower to destroy it. In another exemplary embodiment, the communications manager 116 may facilitate retrieving intelligence data on an approaching enemy force from multiple nodes connected to the GIG 150 by utilizing NR-KPP compliant service requests, which include a priority flag to indicate to other nodes that the data must be retrieved quickly and ahead of other lower priority requests.

The communications manager 116 may operate in conjunction with any appropriate communication systems. For example, the communications manager 116 may control communication systems associated with the communication subsystem of the 146 of the weapon system 140 to effect the communications with the GIG 150. Alternatively, the communications manager 116 may control communications via a separate communications apparatus, such as a communications system built into the NEWS 100 to supplement or replace the communication subsystem of the 146 of the weapon system 140.

In operation, the NEWS 100 is connected to the weapon system 140 to enable communication via the GIG 150. After connection, the NEWS 100 may provide data relating to the status and/or position of the corresponding weapon system 140. Upon activation, the weapon system 140 may be monitored and/or controlled via the GIG 150.

For example, the weapon system 140 and the NEWS 100 may be configured to communicate and provide a desired level of communication. The NEWS 100 may be tailored to optimize reuse and exposure of legacy components from the weapon system 140. The NEWS 100 may be connected to the weapon system 140 via adapters added to hardwired interfaces to expose the internal data stream of the weapon system 140 and/or to generate layered interfaces to expose the internal applications of the weapon system 140 for a more robust two-way interaction with the NEWS 100. The functions enabled and components added via the NEWS 100 may be selected according to any appropriate criteria, such as cost and physical form factor, and may be facilitated by published, open interface standards for the NEWS 100 layer functionality. The selected functions and components contribute to total weapon system extensibility, for example by layering functionality and promoting reconfiguration by the NEWS 100. In addition, during developmental and operational testing, the NEWS 100 may enable monitoring and testing, for example via a simple, compatible web interface on lab and field test units.

Before launch, the NEWS 100 may provide selected data to command and control elements. For example, the NEWS 100 may post identity metadata and status on a local wireless hub at every deployment point for real-time tracking of the corresponding weapon system 100. By providing data regarding position and status, the NEWS 100 enables optimization of weapon mix allocation to final deployed sites. In addition, prior to loading onto a launcher or otherwise preparing for activation, the NEWS 100 on each weapon system 140 may post digital BIT results for enhanced mission reliability, with subsystem results available on request through a web browser interface on loading site testing systems.

For activation, such as for battlefield deployment, the NEWS 100 may operate in conjunction with the GIG 150 to provide monitoring and/or control functions via the GIG 150. The operations may be adapted according to the particular weapon system 140 or other device associated with the NEWS 100. The following examples illustrate various possible operations for monitoring and controlling assets via the NEWS 100.

EXAMPLE 1

The NEWS 100 may be associated with surface-to-air interceptors, such as SM-X variants, for ballistic missile defense. The interceptors may operate as automated control service consumers on the GIG 150 via the NEWS 100, for example to request and receive services from other battlespace systems during flight, based on automated control service from the missiles authorized at launch, to optimize discrimination and prosecution of the target set.

More particularly, sensors may detect an incoming ballistic missile attack, and a salvo of the SM-X weapons are launched from navy destroyers deployed to the protection footprint for the apparent targets of the missiles. The incoming ballistic missiles split into multiple warheads, decoys, and debris. The SM-X weapons contact the GIG 150 to establish control of the SM-X weapons according to various rules. For example, the weapons may register through a user profile to the NCE 170 via the GIG 150, leading to authorized roles based on the policies or rules of engagement built into the initial launch decision.

After launch, the SM-X weapons activate sensors and initiate target discrimination algorithms. The automated control core 310 of the NEWS 100 associated with each SM-X weapon determines discrimination quality and the nature of additional data required to meet a desired discrimination level for optimal target engagement. The NEWS 100 then submits a tagged service request to the NCE 170 via the GIG 150 for sensor and processing services from providers with the right type of information and within quality of service (QoS) constraints, such as time to intercept.

In response to the request from the weapon, the enterprise services may automatically bind various assets, such as sensor services in the form of ground radar from a U.S. force and control services in the form of combined processing and fusion capabilities from the navy destroyer and intelligence reachback systems. Through access to the SM-X weapon entries in the globally-available metadata registry defining the discrimination schema and data types, the bound service providers respond back within QoS requirements, including estimated network path time, with the best available requested data. The data may be reduced to just the newest characteristics in the form required by the automated control core 310.

Upon receiving the requested data, the NEWS 100 associated with the SM-X weapon tasks the sensor core 320 to provide the newest on-board data from the sensor subsystem 142, which the automated control core 310 may fuse with the off-board service data to make the optimal choice of weapon allocation to expected ballistic missile warheads. The communications core 330 supports posting and translation for either an ad-hoc mothership leader-follower arrangement or off-board allocation based on a weapon allocation community of interest service on the NCE 170 to optimally task the available SM-X missiles among the ballistic missile warheads to successfully intercept the incoming warheads.

EXAMPLE 2

The NEWS 100 may be associated with a set of improved precision attack missiles (iPAMs), for example to support ground forces coming under fire from superior enemy force. During flight, the iPAM weapons may use an authorized role provided by warfighter tasking to consume other resources via the GIG 150 to meet timeliness needs in targeting the threatening enemy forces.

For example, Ground Force Alpha (GF-A) is moving through enemy controlled territory with no attached air or artillery support when it is engaged by a superior opposing force. To disengage, GF-A requires immediate suppression of the opposing force. GF-A posts a service request for fire support on the NCE 170 with metadata priority flags corresponding to high priority for units under fire and GF-A status.

The priority flags notify Enterprise Services that GF-A's requests require quick handling and high resource priorities. Enterprise Services may post the new information on the opposing force with appropriate source and situation tagging in Enterprise Systems for smart pull by interested parties. Automatic resource managers on the GIG 150 pull down earlier posted intelligence on the opposing force and determine the best service provider is an army unit with a non-line-of-sight launch system (NLOS-LS) carrying iPAMs chosen for accuracy in view of the fratricide potential.

Upon assignment to the task, the resource managers convey the mission information to the NEWS 100 associated with the NLOS-LS. The resource manager 112 of the NLOS-LS generates a fire mission and estimates an appropriate number of iPAMs, for example based on information received in response to sensor service requests and Enterprise Service data pulls regarding the enemy position and status. The NLSO-LS launches the iPAMs, and the NLSO-LS NEWS 100 transmits information regarding the resulting fire mission and course of action to GF-A. The resource managers on the GIG 150 may bind ad-hoc allocated network resources to the NEWSs 100 associated with GF-A as the service consumer and the iPAMs as the service providers.

Due to the proximity of GF-A to the target site, the mission may be associated with a "danger-close situation" flag in the initial service request. The flag may be automatically processed by the iPAM NEWS automated control core 310 as a mission parameter, such as a constraint not allowing the iPAMs to arm until an updated command authorization and target situation is sent to the iPAMs' NEWS communications cores 330. The automated control core 310 for each iPAM may post a service request to the NCE 170 for greater network resources within a five minute window to provide an opportunity for GF-A to send command authorization and target updates to maximize likelihood of mission success.

Enterprise Services may process the request and allocate dynamic resources as needed, such as GIG 150 bandwidth and sensor services from other nodes. Within the relevant time frame, the GF-A posts a final authorization for the strike and newest target data, such as image characteristics for optimal target prosecution by the iPAM group. The authorization and new targeting imagery data are received via the GIG 150 and processed by the iPAM NEWS automated control cores 310 with control data sent to the sensor core 320, such as the imagery data for highest priority targets, the communications core 330, such as for tagged impact assessment, and the effector core 340, such as to mange the effects level for potential fratricide reduction. Upon successful execution of the fire mission, GF-A is able to withdraw and reroute.

EXAMPLE 3

The NEWS 100 is associated with each missile in a group of miniature air-launched variants (MAL-X) missiles. In this scenario, the missiles are operating as a coordinated group of loiter-capable cruise missiles en-route to a default mission objective. During flight, idle processing and sensor capabilities along with permissive doctrinal constraints may allow for authorized warfighters to pull sensor services en-route within limits imposed by continuing default mission.

En route to the default mission objective, a service request is logged by an authorized warfighter regarding a stationary enemy formation. The service requests calls for sensor services from the coordinated group against the enemy formation, which is suspected to be close to the group flight path. Warfighter authorization to the missile group initiates automated resource management algorithms, leading NCE 170 to instruct a smaller self-contained coordinated group of MAL-S with primarily sensor capabilities to split off to the new objective. The instructions are received by the NEWS 100 for each MAL-X missile in the new group, and the automated control core 310 for each missile adjusts the course of the missile according to the new objective and activates the missile sensors in the sensor subsystem 142 via the sensor core 320. The automated control cores 310 or NCE 170 may assign a new ad-hoc mothership, based on fuel status, position, BIT risk level, and on-board capabilities. The automated control core 310 for the designated MAL-S mothership provides new flight profiles with default sensor service plans to the group via the communication cores 330 and communication managers 116, and the sensor cores 320 of the missiles adjust their sensor subsystems 142 accordingly.

En route to the new objective, the MAL-X sensor subsystems 142 detect enemy movement with potential high value targets that had been suspected based on intel but not previously confirmed. The MAL-S group performs dedicated surveillance of suspected enemy vehicles, posting a combination of direct sensor data and processed ID estimates. The sensor data, characteristics, and availability are transmitted via the sensor core 320 to the automated control core 310, which posts the information to the NCE 170 via the communications core 330 and/or communications manager 116.

Upon receipt of the information, Enterprise Services confirm high confidence by fusing the new data from the missiles with previous data that two vehicles in the convoy are enemy WMD launch systems. An appropriate command and control element, such as a human authority, decides to prosecute the target, and Enterprise Services requests effector services within the defined rules of engagement or other policy with very high priority. Laser-guided bombs on the wing of the closest strike fighter to the enemy formation launch within seconds with timing and conditions posted by the fighter.

Enterprise Services requests sensor service provider functions from the MAL-S group on station based on the needs of effector services. The request is received by the automated control core 310 of the mother ship via the communications core 330 and/or communications manager 116, which assigns a target designation task to one or more of the MAL-S missiles via the NEWS 100. The tasked MAL-S missiles designate the targets with targeting lasers on the two enemy WMD launchers. The bombs home in on the lasers and destroy the targets. After the bombs strike, the MAL-S group may perform a battle damage assessment over selected spectra via the sensor subsystem 142, and post the relevant data via the communications core 330 and/or the communications subsystem 146.

EXAMPLE 4

A SOF unit is on enemy ground maneuvering to their next checkpoint under night conditions. En route, an enemy UAV with unknown capabilities is detected loitering over the path of travel. The SOF requests effector services from the NCE 170 with adjustable yield capability to achieve a kinetic kill without high-explosives, which would be highly visible under the conditions and potentially apprise the enemy of the SOF unit's presence.

Weapon-focused Community of Interest Enterprise Services acknowledge the authorized role of the SOF unit, leading to a request to the NEWS 100 associated with multiple AIM-X air-to-air missiles on a nearby fighter platform, binding the missiles as effector assets for target prosecution. The SOF unit posts target updates and required effector service levels to the NCE 170. The AIM-X weapons receive the service request from the NCE 170 via the communication subsystem 146, communications core 330, and/or communications manager 116, and the NEWS automated control core 310 controls the effector subsystems 148 via the effector core 340 with the managing component resource requirements, for example translating the service needs into fuze settings. The AIM-X's communications core 330 formats the response to the NCE 170 with service agreement and the weapons launch. The AIM-X weapons achieve a kinetic intercept on the enemy UAV, destroying the UAV, and the SOF unit continues its mission.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The present invention has been described above with reference to a preferred embodiment. However, changes and modifications may be made to the preferred embodiment without departing from the scope of the present invention. These and other changes or modifications are intended to be included within the scope of the present invention, as expressed in the following claims.

The invention claimed is:

1. An information management system for providing services from a legacy weapon system including a communications subsystem to a defense network including a plurality of nodes, the legacy weapon system not adapted to operate in conjunction with the defense network, the information management system comprising:
    a system interface configured to connect with the legacy weapon system and responsive to communications with the legacy weapon system;
    a network interface configured to effect communications with the nodes of the defense network via the communications subsystem;
    a local system registry accessible to the nodes via the network interface, wherein the local system registry provides an identifier of the weapon system type of the legacy weapon system and status information indicating which services associated with the weapons system type are currently available; and
    a data processing system in communication with the system interface and the network interface, wherein the data processing system responds to a service request from a node received via the network interface by:
        requesting a service response according to the service request from the legacy weapon system via the system interface;
        receiving the service response from the legacy weapon system;
        translating the service response to a format useable by the node; and
        transmitting the translated service response to the node via the network interface and the communications subsystem.

2. The information management system according to claim 1, wherein the network interface complies with an open standard.

3. The information management system according to claim 1, wherein the system interface complies with an open standard.

4. The information management system according to claim 1, wherein the data processing system includes:
    a control core responsive to the network interface, and
    a subsystem core responsive to the control core and in communication with a subsystem of the legacy weapon system other than the communications subsystem, wherein the subsystem core controls the other subsystem in response to the control core.

5. The information management system according to claim 1, wherein the data processing system further comprises a communications manager in communication with the network interface, wherein the communications manager updates information provided to the node via the network interface only in response to a change in the information.

6. The information management system according to claim 1, wherein the information management system is configured to operate interchangeably with a plurality of embedded computing devices.

7. The information management system according to claim 1, wherein the system interface is configured to communicate with at least one subsystem of the legacy weapon system other than the communications subsystem.

8. The information management system according to claim 1, wherein:
the network interface receives the service request from an asynchronous environment; and
the system interface receives the service response from a synchronous environment.

9. A method for proving services from a legacy weapon system including a communications subsystem to a defense network including a plurality of nodes, the legacy weapon system not adapted to operate in conjunction with the defense network, the method comprising:
providing a local system registry accessible to the nodes via a network interface configured to effect communications with the node via the communications subsystem, wherein the local system registry provides an identifier of the weapon system type of the legacy weapon system and status information indicating which services associated with the weapons system type are currently available;
receiving a service request from a node via the network interface and the communications subsystem;
requesting a service response from the legacy weapon system according to the service request via a system interface;
receiving the service response from the legacy weapon system via the system interface;
translating the service response to a format useable by the node; and
transmitting the translated service response to the node via the network interface and the communications subsystem.

10. The method according to claim 9, wherein the system interface is configured to communicate with at least one subsystem of the legacy weapon system other than the communications subsystem.

11. The method according to claim 9, further comprising updating information provided to the node via the network interface only in response to a change in the information.

12. The method according to claim 9, wherein:
requesting the service response from the legacy weapon system comprises:
providing the service request from a control core to a subsystem core according to the service request; and
controlling a subsystem of the legacy weapon system other than the communications subsystem via the system interface according to the service request; and
receiving the service response from the legacy weapon system comprises:
receiving the service response by the subsystem core from the other subsystem via the system interface; and
providing the service response from the subsystem core to the control core.

13. The method according to claim 9, wherein:
receiving the service request includes receiving the service request from an asynchronous environment; and
receiving the service response includes receiving the service response from a synchronous environment.

14. A non-transient machine readable storage medium storing instructions which, when executed by an information management system, cause the information management system_to execute a method for providing services from a legacy weapon system including a communication subsystem_to a defense network including a plurality of nodes, the legacy weapon system not adapted to operate in conjunction with the defense network, the method comprising:
providing a local system registry accessible to the nodes via a network interface configured to effect communications with the nodes via the communications subsystem, wherein the local system registry provides an identifier of the weapon system type of the legacy weapon system and status information indicating which services associated with the weapons system type are currently available;
receiving a service request from a node via the network interface and the communications subsystem;
requesting a service response from the legacy weapon system according to the service request via a system interface;
receiving the service response from the legacy weapon system via the system interface;
translating the service response to a format useable by the node; and
transmitting the translated service response to the node via the network interface and the communications subsystem.

15. The non-transient machine readable storage medium according to claim 14, wherein the system interface is configured to communicate with at least one subsystem of the legacy weapon system other than the communications subsystem.

16. The non-transient machine readable storage medium according to claim 14, wherein the method further comprises updating information provided to the node via the network interface only in response to a change in the information.

17. The non-transient machine readable storage medium according to claim 14, wherein
requesting the service response from the legacy weapon system comprises:
providing the service request from a control core to a subsystem core according to the service request; and
controlling a subsystem of the legacy weapon system other than the communications subsystem via the system interface according to the service request; and
receiving the service response from the legacy weapon system comprises:
receiving the service response by the subsystem core from the other subsystem via the system interface; and
providing the service response from the subsystem core to the control core.

18. The non-transient machine readable storage medium according to claim 14, wherein
receiving the service request includes receiving the service request from an asynchronous environment; and
receiving the service response includes receiving the service response from a synchronous environment.

* * * * *